US006568077B1

(12) United States Patent
Hellemann et al.

(10) Patent No.: US 6,568,077 B1
(45) Date of Patent: May 27, 2003

(54) BLISK WELD REPAIR (75) Inventors: Leslie McLean Hellemann, Lebanon, OH (US); Christopher Lee English, Mason, OH (US); Bruce Leonard Borne, Florence, KY (US); Ronald Clarence Glover, Batavia, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/567,243

(22) Filed: May 11, 2000

(51) Int. Cl.[7] ............................................... B23P 6/00
(52) U.S. Cl. ....................... 29/889.1; 29/889.7; 228/19
(58) Field of Search .......................................... 228/119

(56) References Cited

U.S. PATENT DOCUMENTS

| | | | | |
|---|---|---|---|---|
| 4,873,751 A | * | 10/1989 | Walker et al. ............. | 29/889.1 |
| 4,940,390 A | | 7/1990 | Clark et al. | |
| 5,033,938 A | * | 7/1991 | Fraser et al. ................ | 229/119 |
| 5,062,205 A | * | 11/1991 | Fraser ........................ | 29/889.7 |
| 5,183,390 A | * | 2/1993 | Amos .......................... | 416/224 |
| 5,351,395 A | * | 10/1994 | Crawmer et al. ........... | 29/889.7 |
| 5,448,828 A | * | 9/1995 | Willems et al. ............. | 29/889.1 |
| 5,479,704 A | | 1/1996 | Richter et al. | |
| 5,558,922 A | * | 9/1996 | Gupta et al. ................ | 29/889.1 |
| 5,584,662 A | * | 12/1996 | Mannava et al. ........... | 228/119 |
| 5,697,151 A | * | 12/1997 | Werner et al. .............. | 29/889.1 |
| 5,735,044 A | * | 4/1998 | Ferrigno et al. ............ | 29/889.1 |
| 6,095,402 A | * | 8/2000 | Brownell et al. ........... | 29/889.1 |
| 6,438,838 B1 | | 8/2002 | Meier et al. | |

FOREIGN PATENT DOCUMENTS

| | | |
|---|---|---|
| DE | 19831736 | 2/2000 |
| EP | 0401187 | 12/1990 |
| GB | 1597042 | 9/1991 |

* cited by examiner

*Primary Examiner*—I Cuda Rosenbaum
(74) *Attorney, Agent, or Firm*—V. G. Ramaswamy; Francis L. Conte (57) ABSTRACT

Damage in a blisk airfoil is machined away to create a notch. A repair is welded in the airfoil to fill the notch. The weld repair is then machined to restore the airfoil to a substantially original, pre-damaged configuration at the repair.

24 Claims, 5 Drawing Sheets

BLISK WELD REPAIR

The U.S. Government may have certain rights in this invention pursuant to contract number N00019-92-C-0149 awarded by the U.S. Department of the Navy.

BACKGROUND OF THE INVENTION

The present invention relates generally to gas turbine engines, and, more specifically, to repair of rotor components thereof.

In a gas turbine engine, air is pressurized in a compressor and mixed with fuel and ignited in a combustor for generating hot combustion gases from which energy is extracted in downstream turbine stages. A typical compressor has multiple stages or rows of rotor blades and corresponding stator vanes which sequentially increase the pressure of the air as it flows in the axial downstream direction.

In a common configuration, compressor blades include integral dovetails for being removably mounted in a corresponding dovetail slot in the perimeter of a rotor disk. This permits the individual manufacture of each blade, and the individual replacement thereof in the event of blade damage during operation. However, such bladed disks require an enlarged disk rim for limiting centrifugal reaction stresses therein around the axial or circumferential dovetail slots used for radially retaining a corresponding row of rotor blades.

A modern improvement over bladed disks in a gas turbine engine is a row of rotor airfoils integrally formed with the perimeter of a rotor disk in a one-piece or unitary blisk configuration. The blade dovetails are eliminated along with the corresponding dovetail slots in the perimeter of the disk, and centrifugal loads are carried from the individual airfoils into the corresponding disk with an inherently strong load-path therebetween. Accordingly, blisks are mechanically stronger than bladed-disks and thusly may be more efficiently configured for reducing disk size and weight for providing additional advantages and performance of the engine.

However, since the blisk airfoils are integrally formed with the supporting disk, the airfoils are not individually removable or replaceable in the event of foreign object damage thereof. Relatively small compressor blisks have been used in commercial service for many years, and are sufficiently small that they may be simply replaced in whole in the event of excessive damage to one or more of the airfoils thereof.

Alternatively, where damage is relatively minor, the damage may be simply removed, by grinding for example, thusly leaving the airfoil with a less than original configuration. This damage removal method is unacceptable for major airfoil damage since aerodynamic performance will be severely degraded, and significant rotor imbalance therefrom may be difficult to correct with ordinary balancing procedures.

Furthermore, damage removal may adversely affect strength of the airfoil itself. A typical compressor airfoil is slender and has a crescent or airfoil profile extending axially between thin leading and trailing edges. The airfoil is cantilevered from its root, with a radially opposite tip spaced closely adjacent to a surrounding casing or shroud during operation. The airfoil is typically twisted from root to tip with a complex three dimensional (3D) configuration or contour for aerodynamically pressurizing airflow during operation.

The contoured airfoil is subject to aerodynamic and centrifugal loads during operation which result in a varying pattern of stress therein. The airfoil must thusly be designed for limiting the maximum airfoil stress for enjoying a suitable useful life during operation, and the airfoil material is typically a high strength material, such as titanium, for accommodating the substantial loads carried during operation.

In the original manufacture of the blisk, its material strength must not be reduced or compromised by the various machining processes used. Excessive temperature must be avoided which would degrade material properties. For example, the machining of the individual airfoils may be done using a milling machine or an electrochemical machine having numerically controlled multiple axes for precision movement. Material is removed from the original workpiece or blank with minimal heat buildup to prevent degradation of the material strength.

Accordingly, the known repair process for compressor blisks is limited to the mere removal of airfoil damage to prevent strength reduction of the airfoil.

The advantages of using compressor blisks in a gas turbine engine are presently promoting the development of substantially larger and more expensive blisks for use in multi-stage axial compressors and low pressure fan compressors upstream therefrom. Fan blisks have relatively thick airfoils and are subject to considerably less foreign object damage than the relatively thin airfoils of compressor blisks downstream therefrom. The compressor blisks are nevertheless relatively large and quite expensive.

For example, a two stage tandem blisk includes two rows of airfoils extending from corresponding disks in a unitary assembly. Damage to any one of the blisk airfoils in either stage affects the usefulness of the entire two stage blisk. The inability to repair a two stage blisk requires the entire replacement thereof at a corresponding substantial cost.

Accordingly, it is desired to provide a method of repairing a blisk for restoring airfoils thereof to an original configuration at the repair site.

BRIEF SUMMARY OF THE INVENTION

Damage in a blisk airfoil is machined away to create a notch. A repair is welded in the airfoil to fill the notch. The weld repair is then machined to restore the airfoil to a substantially original, pre-damaged configuration at the repair.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
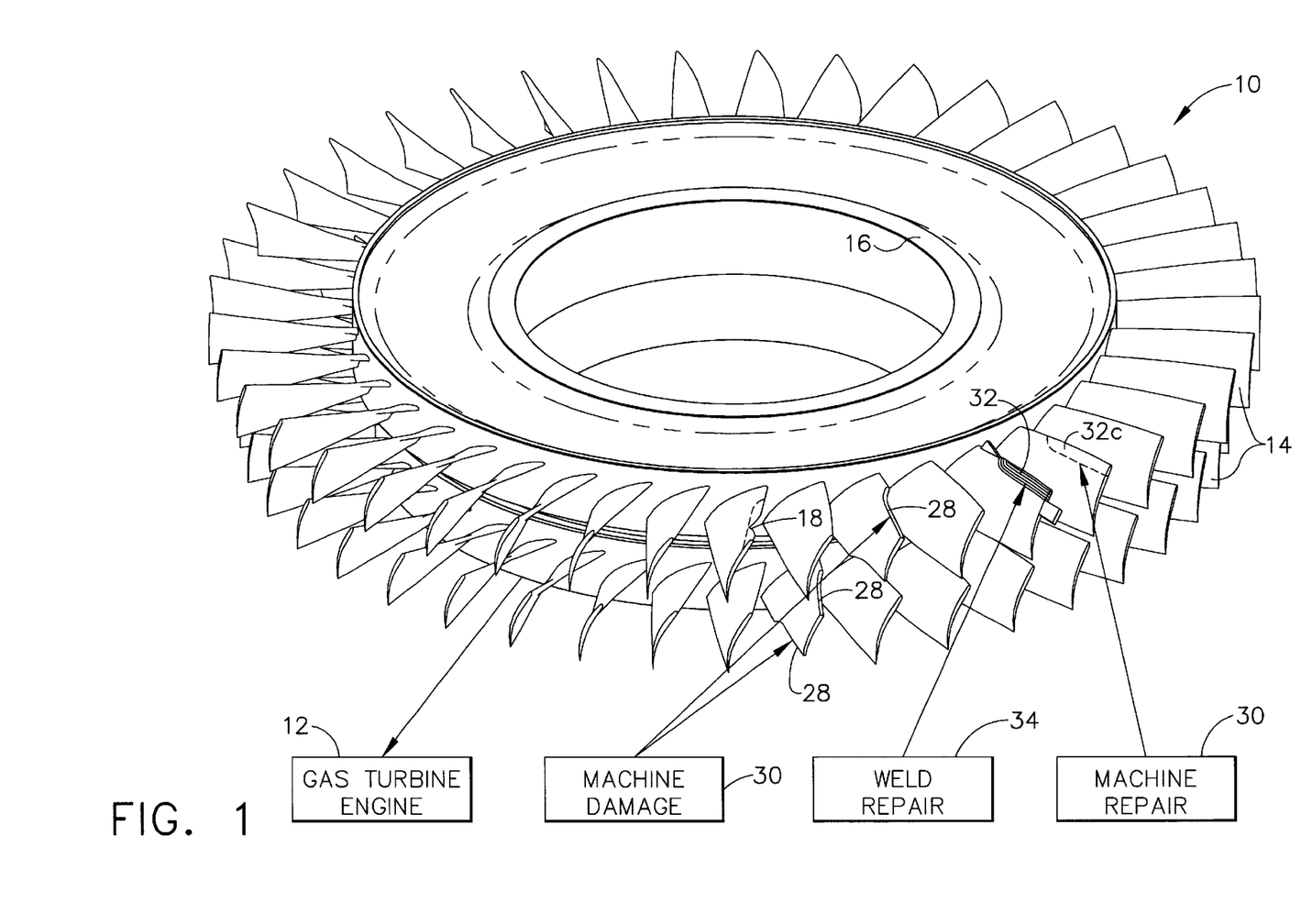
FIG. 1 is an isometric view of an exemplary two-stage compressor blisk for an aircraft gas turbine engine, and a flowchart repair method therefor in accordance with an exemplary embodiment of the present invention.

Illustrated in FIG. 1 is an exemplary blisk 10 removed from a gas turbine engine 12 for repair. The engine may have any conventional form such as a turbofan gas turbine engine for powering an aircraft in flight, and the blisk may come from a multi-stage axial compressor thereof, or a fan disposed upstream therefrom.

In the exemplary embodiment illustrated in FIG. 1, the blisk is in the form of a tandem blisk having two rows or stages of compressor rotor airfoils 14 extending radially outwardly from the rims of corresponding annular disks 16. A blisk is a conventional term of art in which the airfoils 14 are integrally formed with their supporting disk 16 in a unitary or one-piece assembly therewith without retaining dovetails. The individual airfoils extend radially outwardly from the rim or perimeter of the disk integrally therewith, and thusly are not individually removable.

In the exemplary embodiment illustrated, two rows of airfoils 14 extend from corresponding disks which are integrally joined together for providing a unitary two stage blisk, with the axial spacing between the two airfoil rows being sized for receiving a row of stator vanes (not shown) when mounted inside the compressor of the engine.

During operation of the engine, any one or more of the blisk airfoils is subject to foreign object damage 18 which alters the shape of the airfoil from its original, pre-damaged configuration.

Figure 2:
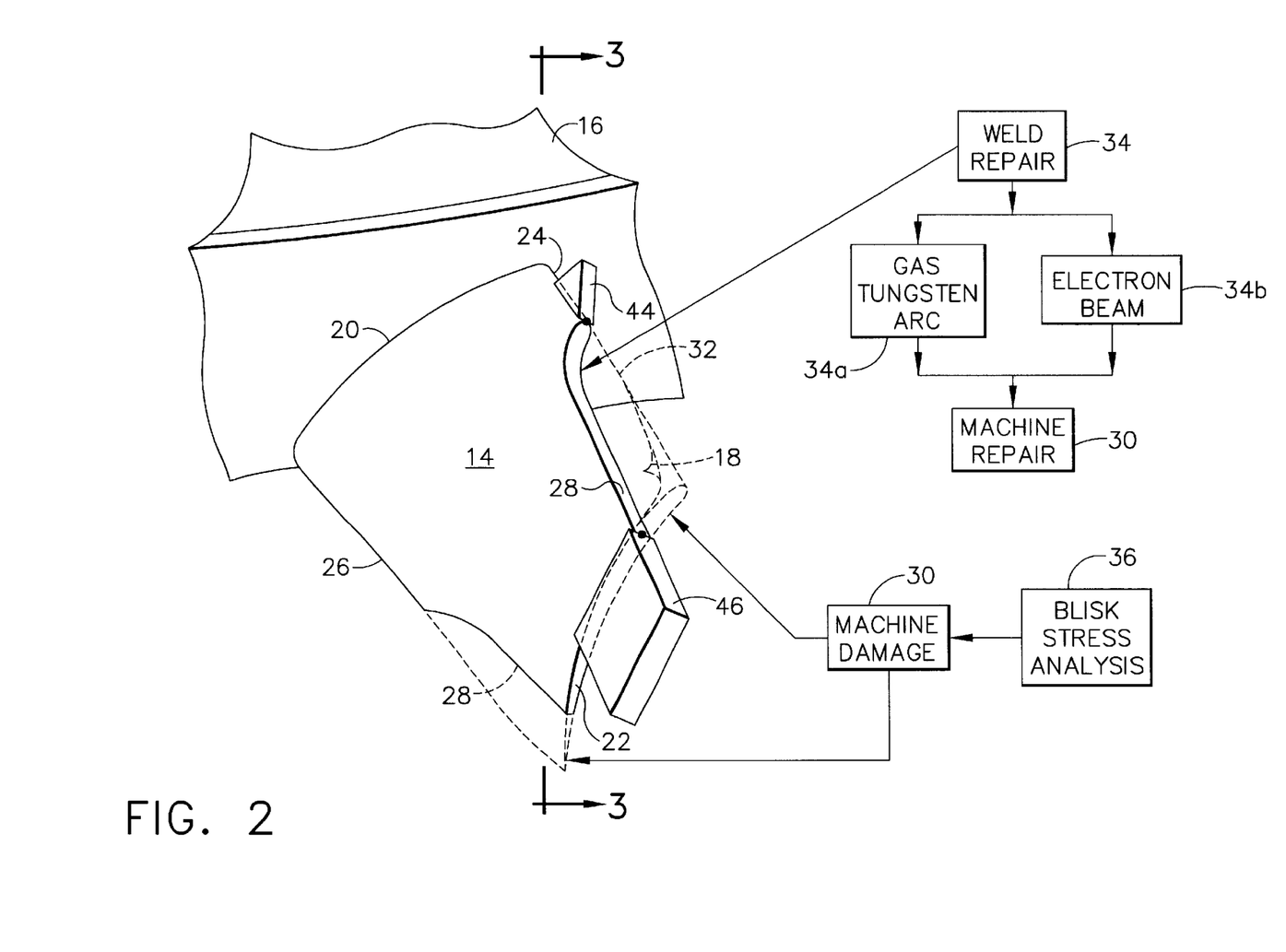
FIG. 2 is an enlarged view of an exemplary one of the blisk airfoils illustrated in FIG. 1 and a corresponding flowchart repair method therefor.

As shown in more particularity in FIG. 2, each airfoil 14 extends radially outwardly from the corresponding integral disk 16 from a root 20 thereat to a radially outer tip 22. Each airfoil 14 is defined by circumferentially opposite sides which extend chordally between axially opposite leading and trailing edges 24,26.

The airfoil 14 has a generally crescent or airfoil shape with a generally concave pressure side and an opposite generally convex suction side bound by a perimeter including the leading and trailing edges, root, and tip. The airfoil configuration varies in three dimensions and typically twists from root to tip for maximizing aerodynamic performance in a conventional manner.

The damage 18 initially illustrated in FIG. 1 is also shown in phantom in FIG. 2 in the exemplary. form of curling of the airfoil leading edge near the tip due to impact from a foreign object. Typical foreign object damage affects primarily airfoil leading edges, and may also affect the airfoil trailing edge typically near the airfoil tip.

Since the blisk airfoils 14 are integrally formed with the supporting disks 16 without retaining dovetails, the airfoils are not removable from the blisk, and thusly are not replaceable as is possible in a conventional bladed-disk utilizing blade dovetails mounted in corresponding dovetail slots in the perimeter of a disk. Accordingly, the individual airfoils 14 can be repaired solely in situ in the blisk, which airfoil repair must not adversely affect strength of the repaired airfoil or strength of any of the undamaged airfoils of the entire blisk.

In accordance with a preferred embodiment of the present invention as illustrated in FIGS. 1 and 2, a method of repairing the blisk removes the undesirable damage and restores the blisk to an original, pre-damaged configuration while maintaining mechanical and material strength thereof for reuse in the gas turbine engine. The damage 18 is initially removed by being machined away from the corresponding airfoil to create a predeterminedly sized and configured cut-out or notch 28 in the airfoil.

Machining away the damage 18 is preferably conducted automatically in a multi-axis numerically controlled milling machine 30 which may be programmed for defining the original configuration of the blisk and its airfoils, and then machining any damaged airfoil to form the notch 28 at the damage site. The milling machine 30 may have any conventional form such as a T30 Machining Center commercially available from the Cincinnati Machine Company of Cincinnati, Ohio.

The notch 28 is then filled by welding a repair 32 therein preferably using a multi-axis numerically controlled welding machine 34. Welding machine 34 may have any conventional configuration for automatically welding the airfoil for filling the machined notch to a suitably larger size than the original airfoil at the damage site as further disclosed hereinbelow.

The weld repair 32 is then itself machined in the same milling machine 30, or alternate machine as desired, to restore the airfoil to a substantially original, pre-damaged configuration at the site of the repair.

As indicated above, the conventional repair of small blisks is limited to removal of minor damage without restoring the repaired airfoil to its original configuration. In this way, secondary heat damage to the original airfoil caused by the machining operation itself is limited, and the reduction of mechanical strength of the so-repaired airfoil is correspondingly limited.

The relatively large blisk and correspondingly large airfoils illustrated in FIGS. 1 and 2 are preferably restored to their original configuration due to the repair process of the present invention. Since welding creates a local heat affected zone having different material properties and strength than the pristine airfoil material, the strength and integrity of the blisk being repaired may be maintained by preferentially limiting the extent of the machined notch 28 and corresponding weld repair 32 formed therein. The original damage 18 is machined away to create the notch 28 having a predetermined configuration and size which is larger in area than the damage 18 being removed.

The size of the notch 28 is predetermined in advance and is preferably uniform or constant for all of the airfoils in a corresponding row of the blisk irrespective of the extent of the damage area therein. Since machining of the notch 28 may be programmed into the milling machine 30, it may be accurately reproduced for each airfoil which requires repair. If the extent of airfoil damage is less than the area of the predetermined notch, the airfoil may then be effectively repaired. If the extent of damage is greater than the predetermined notch, the airfoil may not be effectively repaired by this process, and must be otherwise repaired if possible, or the entire blisk must be scrapped.

The geometry or configuration of the weld repair region for a specific airfoil configuration and size is determined in advance based on a stress analysis of the blisk for use in its specific engine application to isolate the repair from any areas of maximum stress in the airfoil for preventing subsequent failure of the airfoil at or near the repair site.

The original design of a blisk includes sophisticated stress analysis of the airfoils for their intended use. Such stress analysis is conventional, and typically includes modern three dimensional computer analysis of the blisk airfoils subject to aerodynamic and centrifugal loads during operation. FIG. 2 illustrates schematically a computer 36 which may have any conventional configuration for being digitally programmed for performing stress analysis of the blisk for its intended use in the gas turbine engine.

Stress of the blisk during operation may be analyzed analytically in the computer for determining the maximum airfoil stress and location in the airfoil which may be expected during operation. The results of the stress analysis typically include stress. maps for the opposite pressure and suction sides of the individual airfoils which show isoclines of stress from minimum to maximum. The stress map may then be used for specifying in advance the permitted configuration and size of the notch 28 to exclude airfoil locations subject to the maximum stress expected.

In this way, the notch 28 is predetermined in location and extent and is suitably isolated from maximum stress regions of the airfoil so that the subsequent weld repair itself does not lead to airfoil failure therefrom. The maximum stress regions of the airfoil are not altered or affected by the weld repair for maintaining airfoil strength, notwithstanding the weld repair being made and its corresponding. heat affected zone, or weld fusion zone.

As shown in FIGS. 1 and 2, stress analysis conducted for an exemplary blisk limits the position of the notch 28 to the leading or trailing edges 24,26 of the airfoil, or both, and is preferably spaced radially outwardly or outboard from the airfoil root and extending radially outwardly to include respective portions of the airfoil tip 22. Each airfoil 14 is relatively thin along its leading and trailing edges and increases in thickness toward the mid-chord region thereof. In the exemplary design illustrated in FIG. 2, the maximum stress region of the airfoil is spaced between the leading and trailing edges which correspondingly permits the repair notches 28 to be formed along either or both edges of the airfoil as required for removing any foreign object damage found thereat.

In the general embodiment illustrated in FIG. 2, the repair notch 28 has an arcuate profile along the airfoil edges where it diverges therefrom and is generally straight along the airfoil span to the airfoil tip 22. The airfoil may then be repair welded in one embodiment using a gas tungsten arc (GTA) welding machine 34*a* to form the weld repair 32 in a plurality of passes or layers 32*a* to completely fill the repair notch 28, as shown in more detail in FIGS. 3 and 4. GTA welding is conventional, and the welding machine 34 may have any conventional form including a multi-axis numerically controlled welding machine such as the Acu-Weld 1000 system commercially available from Sciaky Inc., Chicago, Ill.

Figure 3:
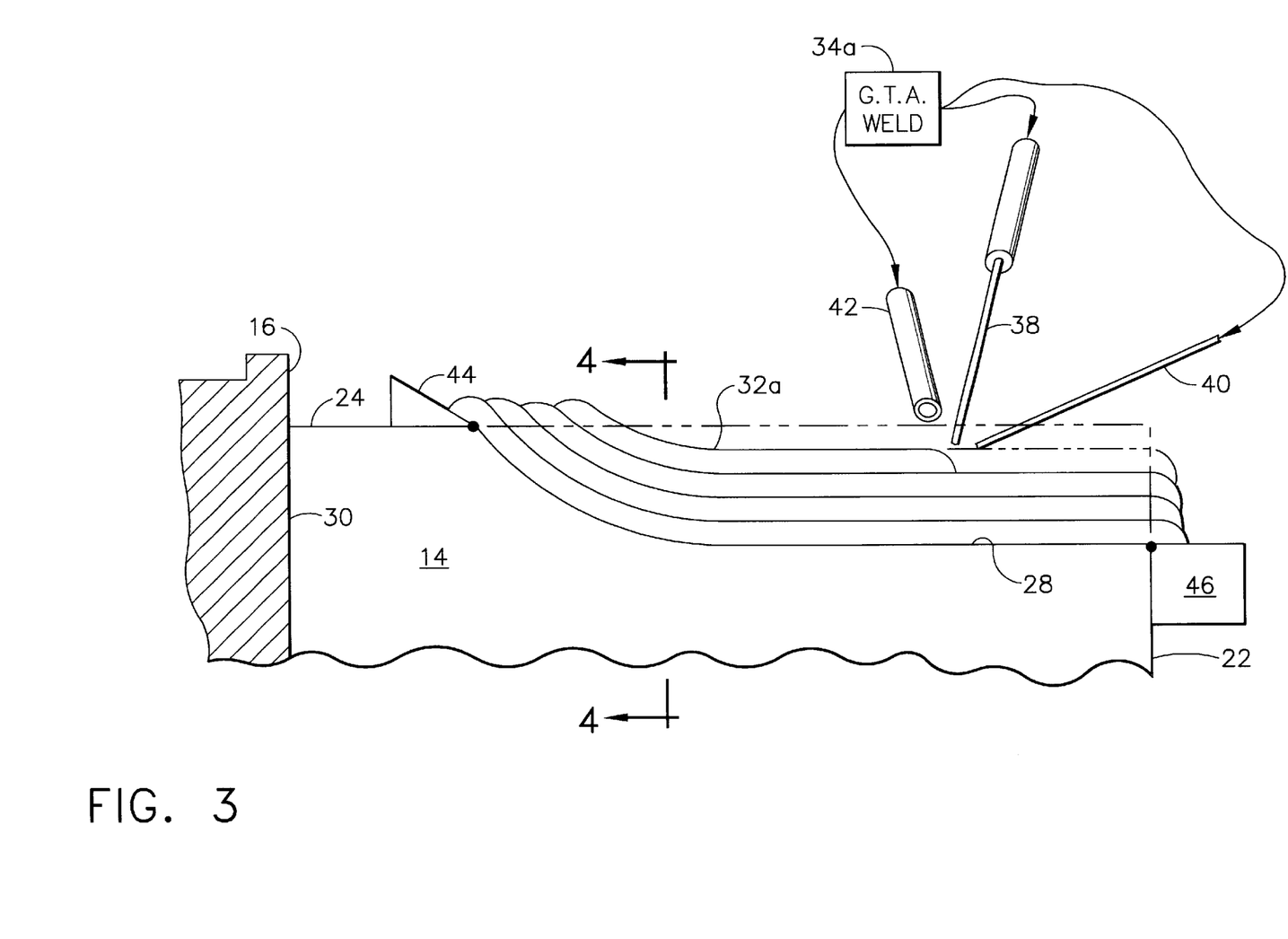
FIG. 3 is a side view of the airfoil shown in FIG. 2 illustrating schematically a weld repair thereof in accordance with an exemplary embodiment of the present invention.

As shown schematically in FIG. 3, the GTA welder 34*a* includes an electrically powered electrode 38 for providing welding heat which melts a suitable filler 40 in wire or powder form delivered to the welding site for creating the weld repair and overlapping layers 32*a* which solidify and fuse to the airfoil along the notch 28 in subsequent passes. The welding machine also includes suitable means 42 for providing an inert cover gas at the weld site for protecting the material properties of the weld repair as it is formed.

Since the individual airfoils 14 illustrated in FIGS. 2 and 3 are repaired in situ in the blisk, access to the individual blades is limited by the proximity of adjacent blades both circumferentially and axially between blade rows depending on the specific location of the repair site. Preferably, each airfoil is surrounded by a temporary enclosure, formed by a wrapping tape for example, in which the cover gas may be introduced by one or more supply tubes. The electrode 38 and filler 40 suitably breach the gas enclosure for performing repair welding within the available space in the blisk.

As shown in FIG. 3, repair welding is preferably initiated or commences outside the notch 28, and terminates and finishes in each pass also outside the notch 28. In operation, the electrode 38 strikes an arc to start the welding process which arc striking creates undesirable weld defects. Accordingly, arc striking and weld initiation preferably commence outside the area of the notch so that only substantially defect-free weld layers 32*a* are formed within the notch 28 for restoring the original configuration of the airfoil thereat.

Similarly, each welding pass must terminate, and is thus subject to weld defects at the termination, which is preferably also effected outside the repair notch 28.

FIG. 3 illustrates an exemplary run-on or start tab 44 suitably affixed to the airfoil, by tack welding for example. The start tab 44 is preferably triangular in shape for its intended use to start the welding process where the notch 28 joins the airfoil leading edge 24. The start tab 44 is thusly affixed to the airfoil leading edge at a radially inner or inboard end of the notch to provide a ramp matching the arcuate curvature of the notch at the leading edge.

Furthermore, a run-off or stop tab 46 is suitably affixed to the airfoil at an opposite end of the notch 28, by being tack welded thereto for example. The stop tab,46 is configured for providing an exit ramp aligned with the straight portion of the notch 28 where it meets the airfoil tip 22. The stop tab may be generally rectangular in shape and is affixed to the airfoil tip at a radially outer or outboard end of the notch 28.

In this way, the start and stop tabs 44,46 provide integral extension ramps at both ends of the repair notch 28 in alignment therewith so that repair welding may be initiated at the start tab 44, and then proceed along the notch 28 itself, and then terminate at the stop tab 46 for each of several layers required to fill the notch. Welding defects attributable to starting and stopping of the welding process are thusly confined to the regions outside the extent of the repair notch 28, and also outside the configuration of the intended restored airfoil thereat.

Each welding layer 32*a* preferably commences outside the airfoil leading edge in subsequent layers atop the start tab 44, and terminates outside the airfoil tip in subsequent layers atop the stop tab 46. When the final welding layer is made in the notch 28, the resulting welding repair 32 is suitably larger in size or dimension than the configuration of the airfoil at the repair site so that subsequent machining may remove excess weld material and any defects found therein.

For the tandem stage blisk illustrated in FIG. 1, the leading edge of the first row of airfoils and the trailing edge of the second row of airfoils are accessible without obstruction by the other row. However, the trailing edge of the first row and the leading edge of the second row are obstructed in part by the opposite blisk row. The configuration of the corresponding repair notches between the airfoils rows is thusly limited by the accessibility of the specific welding apparatus used for effecting the weld repairs.

In the preferred embodiment illustrated in FIG. 3, for example, welding is preferably initiated at the root end of each airfoil requiring repair and terminates at the tip end of the airfoil. In this way, the start tab 44 is subject to considerably less heating than the stop tab 46. The start tab 44 may thusly be made relatively small in its exemplary triangular shape for fitting within the limited space near the blade leading edges. The exposed tips of the airfoils are without obstruction, and a relatively larger, rectangular stop tab 46 may be used thereat to resist thermal distortion from the considerable amount of heat generated by the welding process in the collective passes.

In this way, undesirable heat input into the individual airfoil 14 is limited, along with limiting heating of the start and stop tabs. And, if desired, a copper chill block or apparatus (not shown) may be used to sandwich both sides of the airfoil near the repair notch 28 to remove undesirable heat during the welding process and further protect the integrity of the original airfoil from undesirable distortion.

The filler 40 utilized in filling the notch with weld repair may have any suitable material composition for complementing the original strength of the airfoils 14. The filler material may have a chemical composition similar to or different than the parent airfoil material, as desired for maximizing airfoil properties.

Figure 4:
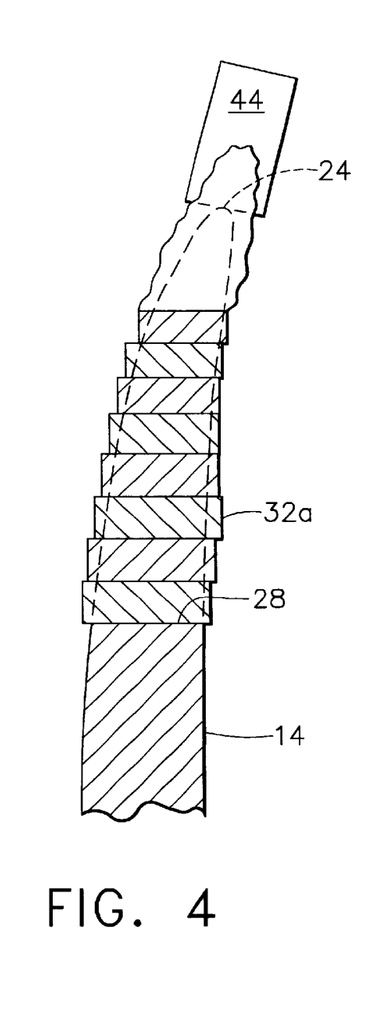
FIG. 4 is a radial sectional view of a leading edge portion of the airfoil illustrated in FIG. 3 and taken along line 4—4.

As shown in FIG. 3, the welding layers 32a each extends continuously from outside the intended leading edge of the airfoil to outside the corresponding tip to follow the radial contour of the notch and airfoil. As shown in FIG. 4, the repair welding also preferably follows the specific arcuate profile which extends transversely or axially across the repair notch 28 to follow the intended airfoil or crescent profile of the airfoil at the repair site, such as the leading edge. In this way, the several repair layers 32a may be precisely formed using the numerically controlled welder to follow the radial and axial profiles of the airfoil at the repair site which typically varies in three dimensional space.

After the welding process, the repair site is suitably machined for removing both the start and stop tabs 44,46 and the excess weld repair to restore the airfoil to its original, pre-damaged configuration in accordance with the corresponding specification therefor. The numerically controlled milling machine 30 illustrated schematically in FIGS. 1 and 2 may be used to precisely machine the repair site to follow the arcuate profile across the now filled-in repair notch and restore the airfoil to the desired configuration. The airfoil being machined is preferably potted in a suitable wax or other matrix for being supported by its airfoil neighbors for minimizing deflection thereof during machining.

The two tabs may be initially removed by grinding at the tack weld sites if desired prior to machining of the repair weld. Grinding should be limited to prevent excessive local heating of the airfoil which could degrade material strength thereof. Machining of the weld repair is typically effected using a cooling lubricant which prevents excessive heating of the airfoil as it is machined.

Machining of the weld repair may be accomplished in steps including a rough machining to a suitable oversize profile, followed by inspection for any defects, and then followed by final machining to the original airfoil configuration. If desired, suitable heat treatment of the repaired airfoil may be performed for reducing or eliminating any residual stress in the repaired airfoil, or otherwise maximizing the material strength of the repaired airfoil.

Figure 5:
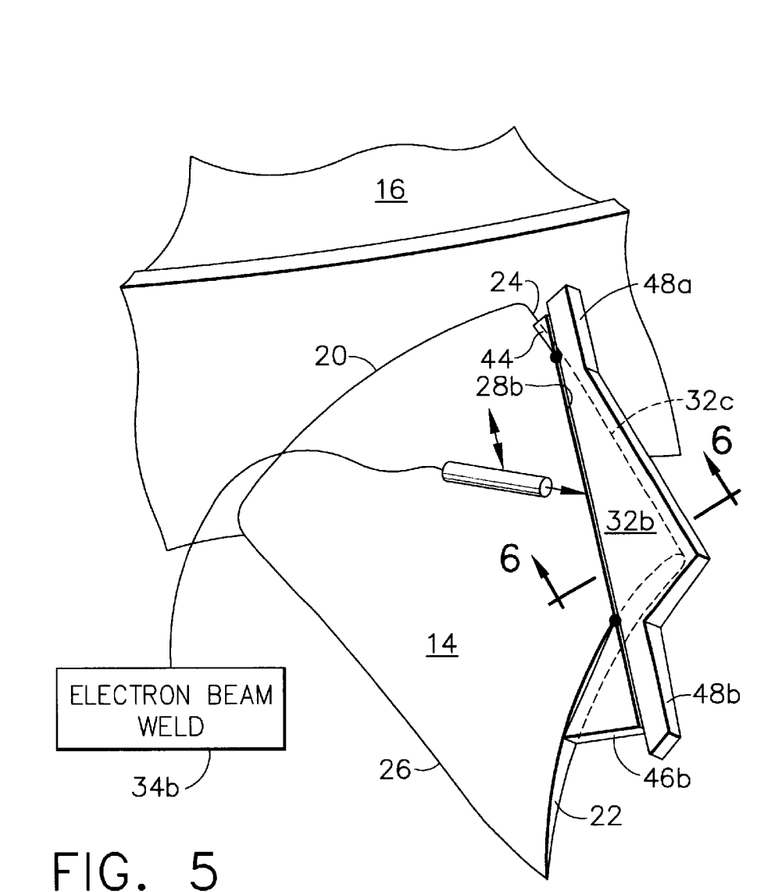
FIG. 5 is an enlarged view of an exemplary one of the airfoils illustrated in FIG. 1 in accordance with another embodiment of weld repairing thereof.

As initially shown in FIG. 2, the weld repair may also be effected using a conventional electron beam welder 34b cooperating with a specifically configured notched airfoil 14 for reducing welding heat input during the repair process. FIG. 5 illustrates an exemplary one of the blisk airfoils 14 wherein the predetermined notch, designated 28b, is generally triangular in configuration and has a straight edge along the airfoil from the leading edge 24 near the airfoil root to the airfoil tip 22 spaced aft from the original leading edge.

In this embodiment, the weld repair includes a pre-formed insert 32b, referred to as a SPAD due to its identification as a spare part in a Spare PArt Drawing (SPAD). The repair insert 32b is complementary with the triangular notch 28b and is electron beam welded to the airfoil along the straight edge of the notch.

As shown in FIG. 5, the repair insert 32b is initially locally affixed in the notch 28b by conventional tack welds at the airfoil leading edge and tip to secure the insert to the airfoil in direct abutment against the straight edge notch.

The electron beam welder or apparatus 34b may have any conventional configuration and typically includes a vacuum enclosure in which the blisk is mounted, and the electron beam is precisely directed along the insert-notch joint for locally melting the joint for welding the insert to the airfoil to effect the repair.

Since electron beam welding must also start and stop, and is thus subject to weld defects thereat, a start tab 44 like the triangular tab illustrated in the FIG. 2 embodiment is also used in the FIG. 5 embodiment at the airfoil leading edge. And, a stop tab 46b, like the corresponding tab illustrated in FIG. 2, is used at the airfoil tip but preferably has a triangular configuration.

The main body of the insert 32b illustrated in FIG. 5 is generally triangular to match the triangular configuration of the notch in the original airfoil initially removed by machining. The insert 32b includes a pair of inboard and outboard extensions 48a,b integral with the insert and being straight along the edge of the insert which adjoins the straight edge of the repair notch 28b. The two tabs 44,46b are configured to continue the straight joint from the repair notch 28b inboard and outboard along the two extensions 48a,b for permitting the electron beam welding to commence outside the notch at the start tab 44 and terminate outside the notch at the stop tab 46b.

This configuration of the insert and the cooperating tabs permits the insert to be electron beam welded to the airfoil along the full extent of the repair notch 28b, including welding of the two extensions 48a,b to the corresponding start tab 44 and stop tab 46. The resulting electron beam weld along the airfoil is substantially defect free.

As indicated above, the notch 28b is preferably triangular with a straight edge along the airfoil from leading edge to tip, and the insert 32b has a complementary triangular configuration. In this way, electron beam welding may precisely follow the straight line joint between the notch 28b and the insert 32b.

In conventional electron beam welding, two workpieces are welded together at a joint by locally melting the material thereof. Electron beam welding precisely controls heat input and creates a strong weld with minimum heat affected zone. However, the absence of filler material will create an underfill or shallow depression along the weld joint which is undesirable for repairing the blisk airfoils. Another type of underfill may result from the direction of welding relative to beam oscillation.

Figure 6:
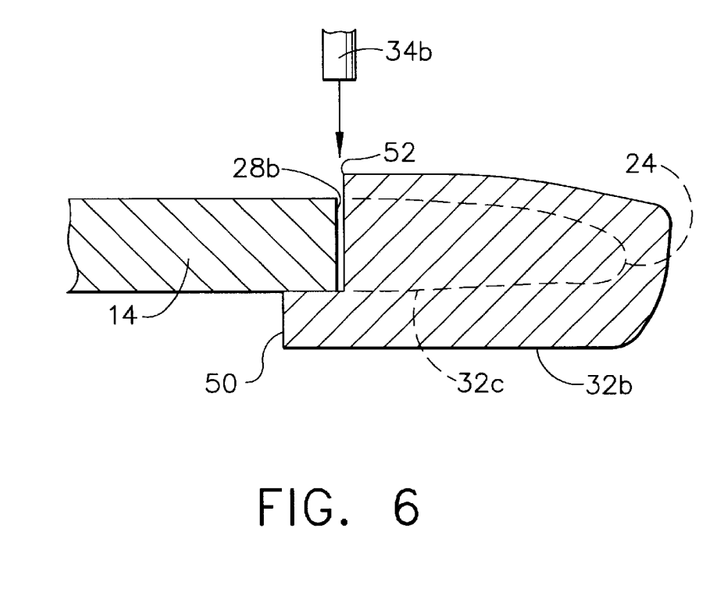
FIG. 6 is a radial sectional view through a leading edge portion of the airfoil illustrated in FIG. 5, including a repair insert being electron beam welded in the airfoil notch.

As shown in FIG. 6, the insert 32b preferably includes an integral lip or ledge 50 on one side thereof along which the corresponding edge of the repair notch 28b may be held in self-alignment. The insert further includes an oversize corner 52 opposite to the ledge 50 along the other side of the straight edge of the repair notch 28b.

During electron beam welding, the electron beam locally melts the airfoil and insert along the interface or joint therebetween to fuse the materials together in a strong bond. The ledge 50 and corner 52 have suitably small thicknesses so that they are melted during the electron beam welding and provide additional material for filling the joint or interface between the airfoil and insert and preventing discontinuities or surface depressions at the resulting weld joint.

Figure 7:
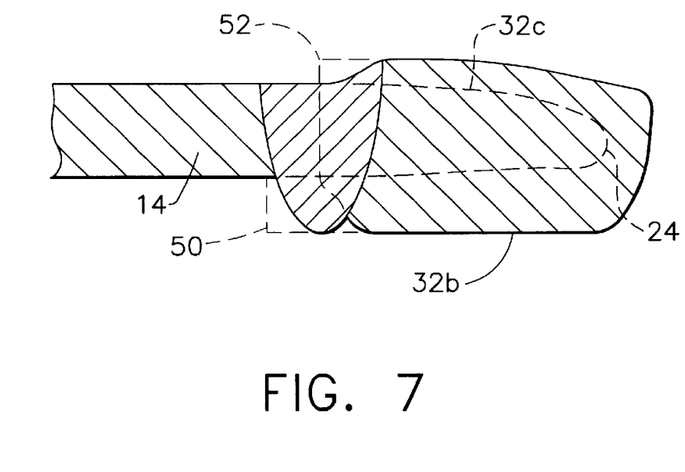
FIG. 7 is a radial sectional view, like FIG. 6, showing the insert following electron beam welding to the airfoil.

FIG. 7 illustrates the completed weld joint with the ledge 50 and corner 52 being melted away during the welding process. The ledge 50 provides the additional advantages of self-aligning the insert along the repair notch and providing a witness feature whose melting during welding confirms complete electron beam welding or consumption of the joint when verified by visual inspection.

After the insert is welded to the airfoil during the process illustrated in FIG. 5, the start and stop tabs 44,46b and insert extensions 48a,b are suitably removed by machining, for example, using the milling machine 30 illustrated in FIG. 1 in a manner similar to the embodiment described with respect to FIG. 2. Similarly, the remaining insert 32b which is initially slightly oversize, may then be machined in the milling machine 30 to restore the airfoil to its original configuration at the repair site. In both the GTA welding and electron beam welding embodiments disclosed above, the resulting finally machined repair, designated 32c, restores the damaged airfoil to its original, pre-damaged configuration as illustrated in phantom lines in FIGS. 1 and 5–7.

An additional advantage of the electron beam welding process is that the repair insert 32b may be pre-formed and heat treated to optimally match the material properties and strength of the original airfoil, as desired. Electron beam welding of the insert to the airfoil results in a restored airfoil having a narrow heat affected zone limited to the region of the airfoil insert immediately adjacent the weld joint. If practical, heat treatment of the welded joint may be effected in any conventional manner without adversely affecting the original material strength of the blisk portions not subject to repair.

As indicated above, the exemplary blisk 10 illustrated in FIG. 1 includes tandem disks 16 with corresponding rows of airfoils 14. The airfoils are thus subject to damage along the leading and trailing edges thereof which may include damage along the trailing edge of the first airfoil row and damage along the leading edge of the second airfoil row. Any such airfoil damage between the two airfoil rows has limited accessibility due to the obstruction provided by those two rows.

Since gas tungsten arc welding and electron beam welding may be effected along narrow lines, the accessibility from the top of the airfoils illustrated in FIG. 1 permits airfoil repair between the two rows of airfoils. Accordingly, any airfoil damage found primarily along the outer spans of the leading and trailing edges between the airfoil rows may be machined away to create correspondingly sized notches therein. The notches may then be repair welded as described above followed in turn by repair machining. That repair machining may be effected using the original equipment which machined the tandem blisks in the first instance, or other equipment as desired.

Particular advantages of the above described repair processes include the ability to automate and precisely machine the repair notches, repair weld those notches, and machine the weld repairs to the desired original airfoil configurations thereat. The predetermined repair notch limits the resulting heat affected zone interface with the original airfoil to only those locations being subject to less than maximum stress during operation of the blisks. In this way, the airfoil repairs are not subject to maximum stress during operation and do not limit the life expectancy of the airfoils or reduce the in-service capability of the blisk.

Furthermore, the automated machining of the repair notches and subsequent repair welds limits local heating of the airfoil and prevents degradation of material properties which could otherwise occur during manual grinding operations, which are thusly limited to final contour benching.

The so repaired blisk described above has fully restored aerodynamic to performance capability while maintaining substantially full strength not compromised by the introduction of the various weld repairs. The blisk may be re-introduced into service for enjoying its full expected life notwithstanding the foreign object damage.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured Letters Patent of the United States is the invention as defined and differentiated in the following claims in which we claim:

1. A method of repairing a blisk having a row of airfoils comprising:
   machining away damage from one of said airfoils to create a notch therein having a predetermined configuration and size which is larger in area than said damage;
   welding a repair in said airfoil to fill said notch; and
   machining said repair to restore said airfoil to a substantially original, pre-damaged configuration at said repair.

2. A method according to claim 1 wherein said notch size is uniform for all of said airfoils in said blisk irrespective of damage area therein.

3. A method according to claim 1 further comprising:
   analyzing stress of said blisk to determine maximum airfoil stress thereof during operation; and
   specifying said predetermined notch size to exclude airfoil locations subject to said maximum stress.

4. A method according to claim 1 further comprising positioning said notch along leading or trailing edges of said airfoil, and spaced outboard from a root thereof.

5. A method according to claim 4 wherein:
   said notch has an arcuate profile along said airfoil; and
   said weld repair is formed in layers to fill said notch.

6. A method according to claim 4 wherein:
   said notch has a straight edge along said airfoil; and
   said weld repair includes a pre-formed insert being complementary with said notch and welded to said airfoil along said straight edge.

7. A method according to claim 4 further comprising initiating and terminating said repair welding outside said notch.

8. A method according to claim 4 further comprising:
   affixing a start tab to said airfoil at an inboard end of said notch;
   affixing a stop tab to said airfoil at an outboard end of said notch; and
   initiating said repair welding at said start tab, proceed along said notch, and then terminate at said stop tab.

9. A method according to claim 8 further comprising welding said airfoil at said notch in a plurality of overlapping layers to fill said notch with said weld repair.

10. A method according to claim 9 wherein said repair welding comprises gas tungsten arc welding including a filler melted at said notch to produce said repair layers.

11. A method according to claim 10 wherein said repair welding follows an arcuate profile transversely across said notch; and said repair machining follows said arcuate profile to restore said airfoil to said arcuate profile across said notch.

12. A method according to claim 11 further comprising removing said start and stop tabs to restore said airfoil to said original configuration.

13. A method according to claim 9 further comprising:

affixing a complementary insert in said notch; and welding said insert to said airfoil to effect said repair.

14. A method according to claim 13 wherein said insert extends inboard from said notch adjacent said start tab, and outboard from said notch adjacent said stop tab.

15. A method according to claim 14 wherein said insert is electron beam welded to said airfoil along said notch, and to both said start and stop tabs inboard and outboard therefrom.

16. A method according to claim 15 wherein:

said notch is straight along said airfoil, and said insert is complementary thereto; and said electron beam welding follows a straight line between said notch and insert.

17. A method according to claim 16 further comprising:

removing said start and stop tabs and said insert extensions therewith; and machining said insert to restore said airfoil to said original configuration at said repair.

18. A method according to claim 8 wherein:

said blisk includes tandem disks with corresponding rows of said airfoils;

said damage is accessible between said airfoil rows; and said damage machining, repair welding, and repair machining are performed between said rows.

19. A method of repairing a blisk having a row of airfoils comprising:

machining away damage from one of said airfoils to create a notch therein in a multi-axis numerically controlled milling machine, said notch having a predetermined configuration and size which is larger in area than said damage;

welding a repair in said airfoil to fill said notch in a multi-axis numerically controlled welding machine; and machining said repair to restore said airfoil to a substantially original, pre-damaged configuration at said repair.

20. A method according to claim 19 further comprising initiating and terminating said repair welding outside said notch.

21. A method according to claim 20 further comprising:

analyzing stress of said blisk to determine maximum airfoil stress thereof during operation;

specifying a predetermined notch size to exclude airfoil locations subject to said maximum stress; and machining away said damage to create said notch having a predetermined size larger in area than said damage.

22. A method according to claim 21 wherein said notch size is uniform for all of said airfoils in said blisk irrespective of damage area therein.

23. A method according to claim 22 wherein said repair welding comprises gas tungsten arc welding including a filler melted at said notch to produce said repair in overlapping layers.

24. A method according to claim 22 further comprising:

affixing a complementary insert in said notch being thicker than said notch at a joint therewith; and electron beam welding said insert to said airfoil along said notch to effect said repair.

\* \* \* \* \*

UNITED STATES PATENT AND TRADEMARK OFFICE
CERTIFICATE OF CORRECTION

PATENT NO. : 6,568,077 B1  
DATED : May 27, 2003  
INVENTOR(S) : Hellemann et al.

It is certified that error appears in the above-identified patent and that said Letters Patent is hereby corrected as shown below:

<u>Column 11,</u>
Line 1, delete "9" and substitute -- 8 --.

Signed and Sealed this

Seventh Day of October, 2003

JAMES E. ROGAN
*Director of the United States Patent and Trademark Office*